July 26, 1960 J. T. CULLETON 2,946,451
APPARATUS FOR SEPARATING ENTRAINED PARTICLES FROM LIQUIDS
Filed Feb. 14, 1957 2 Sheets-Sheet 1

INVENTOR.
JOHN T. CULLETON
BY
ATTORNEY

July 26, 1960 J. T. CULLETON 2,946,451
APPARATUS FOR SEPARATING ENTRAINED PARTICLES FROM LIQUIDS
Filed Feb. 14, 1957 2 Sheets-Sheet 2
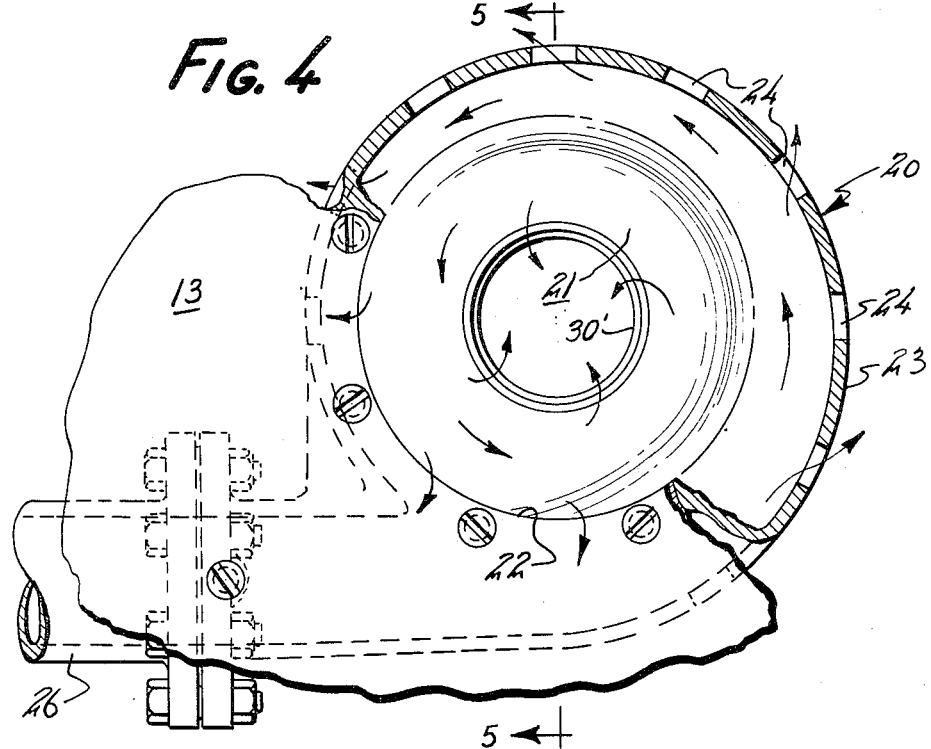
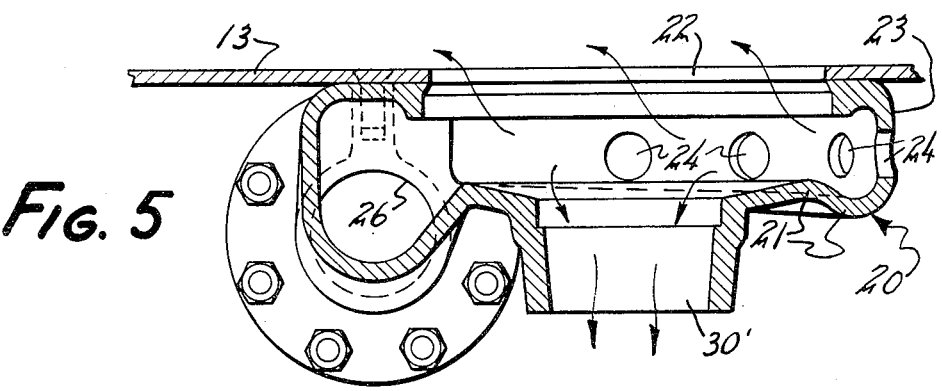
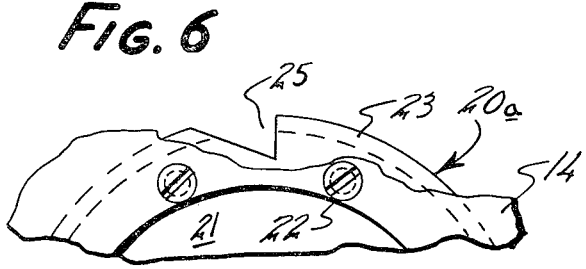
INVENTOR.
JOHN T. CULLETON
BY
ATTORNEY ң
United States Patent Office 2,946,451
Patented July 26, 1960

2,946,451

APPARATUS FOR SEPARATING ENTRAINED PARTICLES FROM LIQUIDS

John T. Culleton, Hayward, Calif., assignor to Pacific Pumping Company, Oakland, Calif., a corporation of California Filed Feb. 14, 1957, Ser. No. 640,146

3 Claims. (Cl. 210—512)

This invention relates to improvements in apparatus for separating entrained sand and other granular particles from water and other liquids.

The water pumped from deep wells for distribution into municipal water supplies carries up with it large amounts of entrained sand, and this sand must be removed before the clean water can be distributed. Attempts have long been made to solve this removal problem, but without reaching a satisfactory solution. Settling basins consume too much space for many installations, and centrifugal separators heretofore in use have been expensive and have involved a relatively complex mechanical structure which was too easily put out of order by the abrasive action of the sand. These prior art centrifugal separators also failed to achieve complete removal of the sand, and the sand that was removed has tended to pack in and block off the disposal outlet.

An object of the present invention is to provide an improved separator of very simple construction and foolproof operation.

Another object of the invention is to provide an improved and more efficient device for separating entrained granular particles such as sand from liquids such as water.

Another object of the invention is to provide an improved apparatus for carrying the separated sand away from the separator.

In this invention a small-diameter centrifugal separator is combined with a much larger-diameter partition in a separator tank dividing the tank into upper and lower compartments. The inlet water containing the sand is introduced into the centrifugal separator, which is located just below a central opening through the partition. The bulk of the sand, along with a small amount of water, is expelled into the lower compartment through peripheral openings in the centrifugal separator's walls, while the bulk of the water, almost entirely freed from sand, passes into the upper compartment, where the remaining sand is swirled out to the edges and settles down around the partition into the lower compartment. A specially constructed disposal outlet for the sand is provided in the lower compartment, including means for preventing packing and for breaking up any packing that may occur.

Other objects and advantages will appear from the following description of some preferred embodiments given in compliance with 35 U.S.C. 112.

In the drawings:

Fig. 4 is an enlarged plan and sectional view of the centrifugal separator of Figs. 1–3.

Fig. 5 is a view in section along the line 5—5 of Fig. 4.

Fig. 6 is a plan view of a modified form of centrifugal separator.

Figure 1:
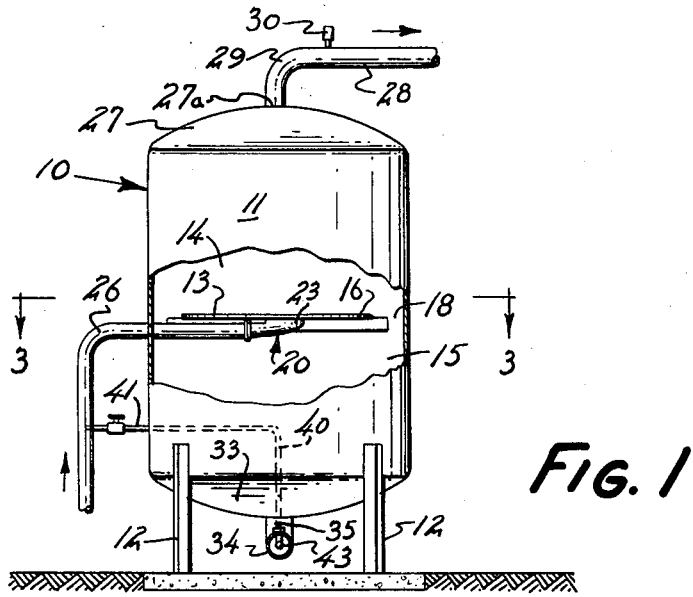
Fig. 1 is a view in elevation and partly in section of an apparatus embodying the principles of the present invention.
Figure 2:
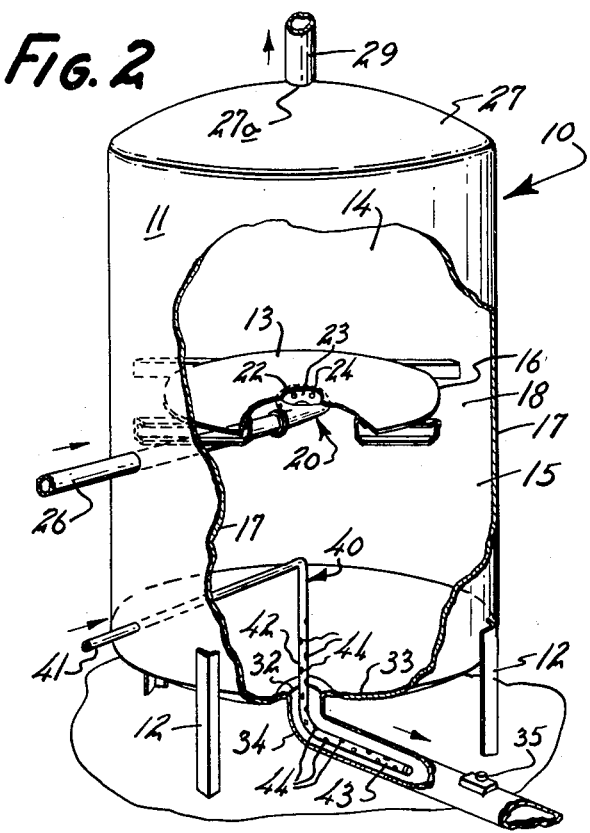
Fig. 2 is a view in perspective of the apparatus of Fig. 1 with the side walls and some other portions partially broken away to show the interior thereof.
Figure 3:
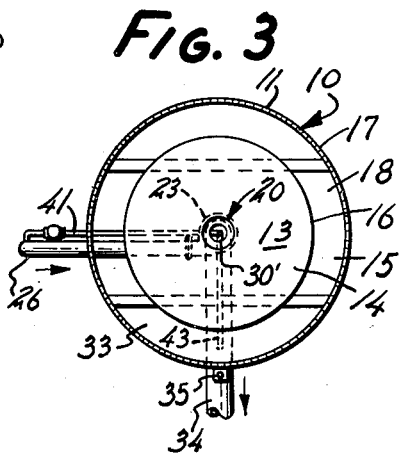
Fig. 3 is a view in section taken along the line 3—3 in Fig. 1.

The sand separator 10 shown in Figs. 1 and 2 includes a generally cylindrical tank 11, preferably supported above the ground by legs 12 in lieu of providing an underground sand-disposal system, although that is sometimes feasible. The tank 11 is divided by a horizontal plate 13 (Figs. 2 and 3) into an upper separator compartment 14 and a lower accumulator compartment 15. The outer edge 16 of the plate 13 is spaced inwardly from the cylindrical walls 17 to provide peripheral openings 18 connecting the outer edges of the two compartments 14 and 15. Since the water velocity is necessarily smallest at the periphery, this structure enables sand to settle out from the separator compartment 14 into the accumulator compartment 15. In an eight-foot wide tank 11 the plate 13 may be spaced as much as one foot from the walls 17.

On the lower side of the partition plate 13 is secured a centrifugal separator 20, whose bottom wall 21 is closed except for a small central drain opening 30′. The upper end of the separator 20 is a central opening 22 through the partition plate 13, leading into the upper chamber 14. In a separator 20 about sixteen inches in diameter, the opening 22 may be about 12 inches in diameter. The outer peripheral walls 23 of the separator 20 are provided with a series of perforations 24, which may comprise four or five holes ½″ in diameter. As an alternative, a slot opening 25, as shown in Fig. 6 in the separator 20a, may be used. In many instances the slot 25 construction is preferable.

Water enters the separator 20 from an inlet pipe 26 on a generally tangential line within the periphery 23. The water therefore is whirled rapidly around the relatively small circumference of the separator and over 90% of it flows out through the upper central opening 22 into the separator compartment 14. However, the heavy sand particles which are forced by the high centrifugal velocity out against the peripheral side wall 23, are ejected through the openings 24 or 25 into the lower compartment 15, consequently, by far the largest proportion of the sand never enters the upper compartment 14. Nearly all the sand, along with a very small amount of the water, is therefore ejected directly into the accumulator compartment 15, where the sand settles toward the bottom. Excess sand carried into the separator compartment 14 is moved by centrifugal action against the side walls 17 where it falls down through the space 18 between the partition 13 and the cylindrical wall 17.

The water in the separator compartment 14 moves up toward an outlet 27a, which is located in the center of the top wall 27, so that practically 100% elimination of the sand is achieved. The clean water passes up through an outlet pipe 28, which may be provided with an elbow 29 to reduce its height. An air bleeder valve 30 may be provided in the outlet pipe 28 for eliminating the air that would otherwise be present at the commencement of operations.

The accumulator compartment 15 has a sand outlet 32 through its bottom wall 33, and the sand that accumulates is washed down through a pipe 34 to a sand disposal unit (not shown) preferably through a lubricated plug valve 35. In many installations, the sand is very fine and tends to pack. Once packed, it will not move, and the impulse of water bearing on it will only pack it tighter. This invention, however, provides means for loosening this sand, comprising a jet unit 40 which, in this instance, comprises a small diameter inlet pipe 41 through which flows a certain amount of the unrefined unseparated water. The pipe 41 extends through the side walls into approximately the radial center and closely above this bottom outlet 32. There the pipe 41 turns downward to provide a vertical portion 42, at the end of which is a horizontal portion 43 terminating near the plug valve 35. The vertical and horizontal portions, 42, 43 are provided with a series of small outlet openings 44 from which jets of water pass out radially.

About once each week or ten days, or at whatever period is desirable, depending upon the installation, water may be passed into the pipe 41 so as to flow out through the jet openings 44. At the lower end, these jets break up the packed sand and immediately begin carrying away some of the sand, while the spray at its upper end is normally sufficient to move the sand once it has been freed at the lower end. The jet is kept turned on until no packed sand remains, and it is then turned off, it being unnecessary to use it again until sand has once again accumulated to an objectionable level in the accumulator compartment 15.

Thus, in operation, water with entrained sand enters the centrifuge 20 from the inlet pipe 26. The rapid whirling inside the small-diameter centrifugal separator 20 throws most of the sand and a little water out the openings 24 or 25 into the accumulator compartment 15, while most of the water and a very small fraction of the sand pass through the opening 22 into the upper compartment 14. Water generally passes through the drain opening 30 (which is at the center of the whirling vortex) only at the beginning and end of operation. There, the water continues to whirl, forcing the sand particles outwardly, where the low velocity enables the sand to settle down through the spaces 18 into the accumulator compartment 15. The pure water goes out the outlet pipe 28.

The settled sand is washed out the disposal pipe 34. If and when it packs in the outlet opening 32, a small stream of water pumped into the pipe 41 goes out the jet openings 44, breaks up the packed sand and washes it out the pipe 34.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim.

1. A unit for separating entrained sand from water, including in combination: a vertical cylindrical tank having a side wall, a top wall with a central outlet for water and a bottom wall with a central outlet for a sand slurry; a flat annular disc spaced well below said top wall and well above said bottom wall, so as to divide said tank into upper and lower compartments, the outer periphery of said disc being spaced radially inwardly from said side wall to free said upper compartment from remaining sand by centrifugal action of the water therein, said disc having a central opening therethrough and being otherwise imperforate; and a small-diameter, shallow, flat, disc-like, horizontally-disposed, hollow centrifugal separator secured to the lower surface of said disc around its said central opening, the bottom surface of said separator being imperforate except for a small central drain opening, the top of said separator being closed by said disc except at said central opening, whence water, largely freed from sand, whirls up into said upper chamber, the periphery of said separator being perforated to provide openings for the passage of most of said sand and being located radially outside said central opening and radially well inside the periphery of said disc, said separator having tangentially entering inlet means for water carrying entrained sand.

2. A unit for separating entrained sand from water, including in combination: a vertical cylindrical tank having a side wall, a top wall, and a bottom wall; a flat annular disc spaced well below said top wall and well above said bottom wall, so as to divide said tank into upper and lower compartments, said tank having a water outlet from said upper compartment and a sand outlet from said lower compartment, the outer periphery of said disc being spaced radially inwardly from said side wall, said disc having a central opening therethrough and being otherwise imperforate; and a small-diameter, disc-like, horizontally-disposed, hollow centrifugal separator suspended from said disc below and around its said central opening, the bottom surface of said separator being imperforate except for a small central drain opening, the top of said separator being closed by said disc except at said central opening, the periphery of said separator being perforate and being located radially outside said central opening and radially well inside the periphery of said disc, said separator having tangentially entering inlet means for water carrying entrained sand.

3. A unit for separating entrained sand from water, including in combination: a vertical cylindrical tank having a side wall, a top wall, and a bottom wall with a sand-disposal outlet therefrom; a flat annular disc spaced well below said top wall and well above said bottom wall, so as to divide said tank into upper and lower compartments, said tank having a water outlet from said upper compartment, the outer periphery of said disc being spaced radially inwardly from said side wall, said disc having a central opening therethrough and being otherwise imperforate; a small-diameter, disc-like, horizontally-disposed, hollow centrifugal separator suspended from said disc below and around its said central opening, the bottom surface of said separator being imperforate except for a small central drain opening, the top of said separator being closed by said disc except at said central opening, the periphery of said separator being perforated and being located radially outside said central opening and radially well inside the periphery of said disc, said separator having tangentially entering inlet means for water carrying entrained sand, said sand being whirled out from said perforated periphery and also passing radially out and down in said upper chamber and therefore settling toward said sand-disposal outlet; and an inlet tube for water entering said sand disposal outlet and extending therein and having radially outward outlets in and adjacent said sand-disposal outlet, to prevent the latter from plugging.

References Cited in the file of this patent

UNITED STATES PATENTS

| | | |
|---|---|---|
| Re. 14,234 | Otterson | Dec. 19, 1916 |
| 1,202,356 | Blackmer | Oct. 24, 1916 |
| 2,016,642 | Lincoln | Oct. 8, 1935 |
| 2,308,670 | Bolton | Jan. 19, 1943 |